(12) United States Patent
Latzina et al.

(10) Patent No.: US 9,330,176 B2
(45) Date of Patent: May 3, 2016

(54) TASK-ORIENTED SEARCH ENGINE OUTPUT

(71) Applicants: Markus Latzina, Wiesenbach (DE); Anoshirwan Soltani, Leimen (DE)

(72) Inventors: Markus Latzina, Wiesenbach (DE); Anoshirwan Soltani, Leimen (DE)

(73) Assignee: SAP SE, Walldorf (DE)

( * ) Notice: Subject to any disclaimer, the term of this patent is extended or adjusted under 35 U.S.C. 154(b) by 59 days.

(21) Appl. No.: 13/676,601

(22) Filed: Nov. 14, 2012

(65) Prior Publication Data

US 2014/0136519 A1   May 15, 2014

(51) Int. Cl.
*G06F 17/30* (2006.01)

(52) U.S. Cl.
CPC ................................ *G06F 17/30864* (2013.01)

(58) Field of Classification Search
None
See application file for complete search history.

(56) References Cited

U.S. PATENT DOCUMENTS

| | | | | |
|---|---|---|---|---|
| 7,685,118 B2* | 3/2010 | Zhang | | 706/55 |
| 7,822,699 B2* | 10/2010 | Katariya et al. | | 706/45 |
| 8,087,019 B1* | 12/2011 | Sobotka | G06Q 30/0241 | 705/14.4 |
| 8,122,016 B1 | 2/2012 | Lamba et al. | | 707/723 |
| 8,229,944 B2* | 7/2012 | Latzina et al. | | 707/759 |
| 8,560,532 B2* | 10/2013 | Lamba et al. | | 707/723 |
| 2003/0154232 A1* | 8/2003 | Beringer et al. | | 709/102 |
| 2005/0028156 A1* | 2/2005 | Hammond | G06F 17/30699 | 718/100 |
| 2006/0041632 A1* | 2/2006 | Shah et al. | | 709/217 |
| 2007/0033261 A1* | 2/2007 | Wagner et al. | | 709/217 |
| 2007/0124263 A1* | 5/2007 | Katariya et al. | | 706/14 |
| 2007/0130186 A1* | 6/2007 | Ramsey et al. | | 707/101 |
| 2007/0276818 A1* | 11/2007 | Cook et al. | | 707/3 |
| 2008/0065603 A1* | 3/2008 | Carlson et al. | | 707/3 |
| 2008/0319947 A1* | 12/2008 | Latzina et al. | | 707/3 |
| 2009/0157729 A1* | 6/2009 | Herlocker et al. | | 707/102 |
| 2010/0077327 A1* | 3/2010 | Pulsipher et al. | | 715/764 |
| 2010/0106801 A1* | 4/2010 | Bliss | G06F 17/3087 | 709/219 |
| 2010/0161601 A1* | 6/2010 | Gruber | | 707/736 |
| 2010/0293180 A1* | 11/2010 | Vanderwende et al. | | 707/759 |
| 2011/0035402 A1* | 2/2011 | Agrawal | G06F 17/30864 | 707/769 |
| 2011/0066647 A1* | 3/2011 | Chan | G06F 17/30545 | 707/770 |
| 2011/0314375 A1* | 12/2011 | Zaika | G06F 3/0482 | 715/708 |
| 2012/0158798 A1* | 6/2012 | Patil | | 707/810 |
| 2012/0166413 A1* | 6/2012 | LeBaron | | 707/709 |
| 2012/0209858 A1* | 8/2012 | Lamba et al. | | 707/748 |
| 2012/0289254 A1* | 11/2012 | Dishneau | G06Q 10/1097 | 455/456.3 |
| 2013/0173573 A1* | 7/2013 | Song | G06F 17/30864 | 707/706 |
| 2015/0254593 A1* | 9/2015 | Ramos Rinze | G06Q 10/06398 | 705/7.13 |

* cited by examiner

*Primary Examiner* — Hung Le
(74) *Attorney, Agent, or Firm* — Brake Hughes Bellermann LLP

(57) ABSTRACT

A task-oriented search tool searches for one or more tasks related to a search term submitted via a computer-user interface. The task-oriented search tool displays search results that include a task related to the search term and a task-solving tool for performing the task related to the search term.

18 Claims, 6 Drawing Sheets

TASK-ORIENTED SEARCH ENGINE OUTPUT

BACKGROUND

A search engine is an information retrieval system designed to help find information stored on computer systems. A web search engine is designed to search for information on the World Wide Web. In contrast, an enterprise search engine is a search engine to search enterprise documents as opposed to a general web search. In general, search engines retrieve information based on search queries submitted by users. The information that is retrieved by the search engines can depend on exact or proximity matching of search terms or keywords input by the users. Some search engines may rank the search results to decide in which order the results should be presented or displayed to the users. However, common search engines remain agnostic with respect to the use of the search results by the users. Users are left on their own to determine the relevance or use of the search results, for example, for performing tasks that they may have at hand.

Consideration is now being given to directing search results to support users in performing tasks.

SUMMARY

A computing device hosts a "task-oriented" search engine application or tool that directs a user to tasks associated with search terms. The task-oriented search tool includes a semantic layer that conceptualizes search terms in a search query and correlates the search terms with one or more tasks by concept. The task-oriented search tool further locates and presents task-solving applications or tools to assist the user in performing the one or more tasks.

In a general aspect, a computer system includes a processor (e.g., a microprocessor) and a task-oriented search tool configured to search for one or more tasks related to a search term. The task-oriented search tool includes a semantic layer that interprets and correlates the search term with one or more tasks. The task-oriented search tool conceptualizes the search term and searches for the one or more related tasks by concepts.

In another aspect, the computer system includes a repository of pre-defined tasks that the task-oriented search tool searches to find the one or more tasks related to the search term. In an enterprise or business entity implementation of the computer system, the repository of pre-defined tasks can include a set of tasks that are assigned to users or enterprise or business personnel under the entity's policies or rules.

In a further aspect, a task (e.g., a task listed in the repository of pre-defined tasks) is associated with one or more task-solving tools. The task-oriented search tool displays on a computer-user interface search results, which include a task related to the search term and a task-solving tool for performing the task related to the search term. The task-oriented search tool can pre-configure a displayed task-solving tool selected by a user to perform the task, for example, by pre-filling input fields in the displayed task-solving tool.

In a general aspect, a computer-implemented method includes providing a processor coupled to a task-oriented search tool, which is configured to search for one or more tasks related to a search term submitted via a computer-user interface. The task-oriented search tool conceptualizes the search term and searches for the one or more tasks by concepts. In another aspect, the method includes providing a repository of pre-defined tasks, which the task-oriented search tool can search to find the one or more tasks related to the search term.

In yet another aspect, the method includes presenting dual search results—tasks and associated task-solving applications or tools, on a computer user-interface. The task-oriented search tool provided by method is configured to display both a task related to the search term and a task-solving tool for performing the task related to the search term. The task-oriented search tool can be further configured to share information between a first task-solving tool selected by a user to perform a first task related to the search term and a second task-solving tool for performing a second task related to the search term.

In a general aspect, a non-transitory computer readable medium carries instructions capable of being executed on a processor, which instructions when executed allow a computer device to provide a task-oriented search tool that is configured to search for one or more tasks related to a search term submitted via a computer-user interface. The instructions when executed further can cause the task-oriented search tool to display search results, which can include a task and a task-solving tool for performing the task related to the search term.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

A search engine application is configured with a task-oriented search tool, which responds to search term queries by directing users to tasks related to the search terms. The task-oriented search tool may include a semantic layer that correlates search terms in a search query submitted by a user with one or more tasks. The task-oriented search tool may further locate and present interactive task-solving applications or tools to assist the user in performing the one or more tasks.

Figure 1:
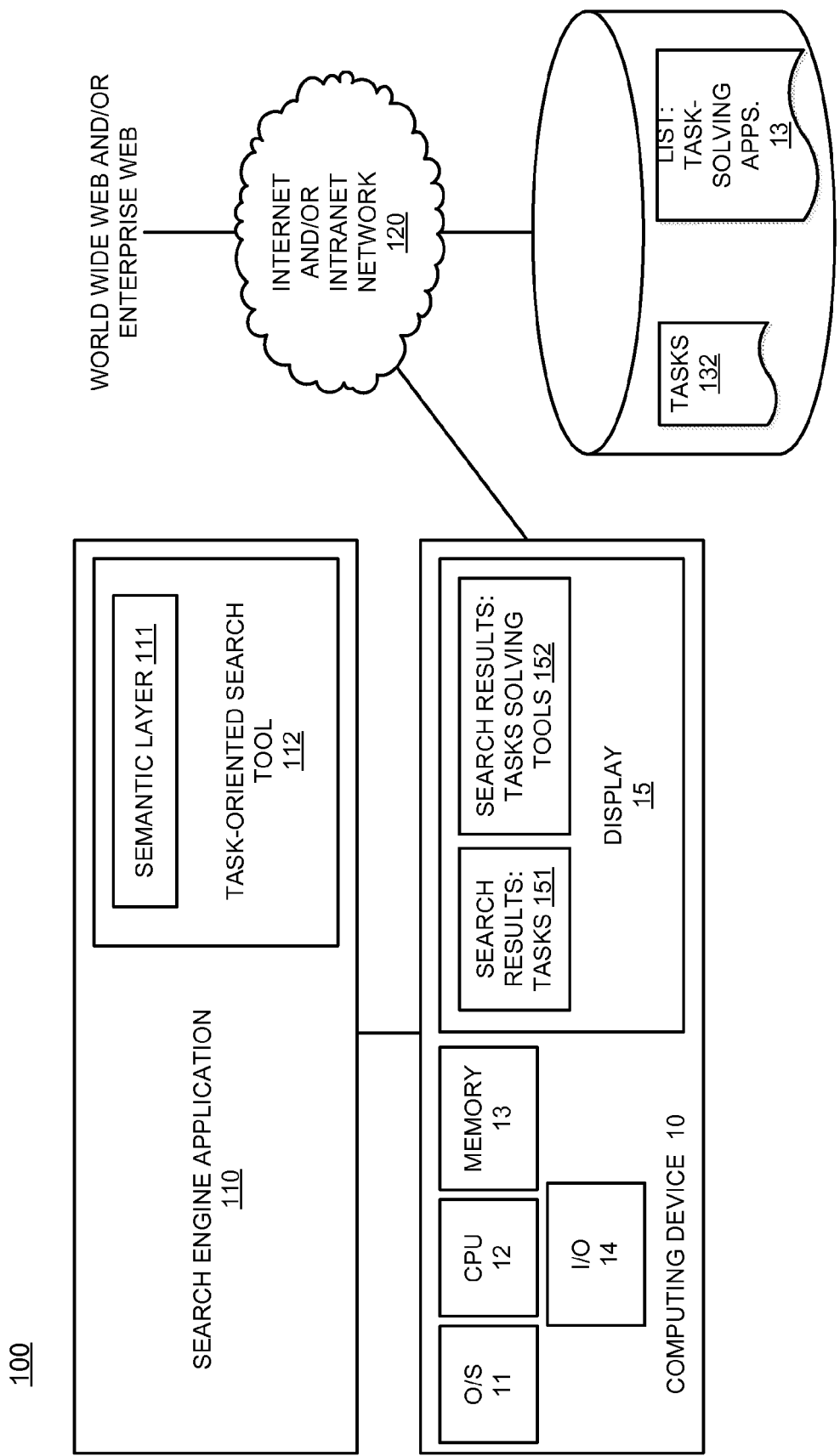
FIG. 1 is a schematic block diagram of an example system with a search engine application that is configured to direct users to tasks and to support the users in performing particular tasks, in accordance with the principles of the disclosure herein.

FIG. 1 shows an example system 100 in which a search engine application 110 is configured with a task-oriented search tool 112 that can direct users to tasks and support the users in performing particular tasks, in accordance with the principles of the disclosure herein.

In system 100, search engine application 110, which may be a web search engine and/or an enterprise search engine, may be hosted on one or more standalone or networked physical or virtual computing machines. FIG. 1 shows, for example, search engine application 110 hosted on a computing device 10 (e.g., a desktop computer, mainframe computer, personal computer, mobile computing device, laptop, tablet, or smart phone), which may be available to a user. Computing device 10, which includes an O/S 11, a CPU 12, a memory 13 and I/O 14, may further include or be coupled a user-interface (e.g., a display 15) through which the user may, for example, submit search queries in search engine application 110 and receive search results.

Search engine application 110 may be linked, for example, via Internet or intranet connections (e.g., network 120) to data sources on the web (e.g., world wide and/or enterprise webs) or other computers. Search engine application 110 may be configured so that task-oriented search tool 112 searches for and identifies tasks that may be related or relevant to a user's search query. For example, task-oriented search tool 112 may be configured to identify related or relevant tasks such as "rent a car", "buy a car," etc., in response to a search query term "car." Search engine application 110/task-oriented search tool 112 may be further configured to search for and identify task-solving applications or tools that may help or assist the user in performing one or more of the identified tasks. For example, with respect to the task "buy a car," search engine application 110 may be configured to identify tools for comparison shopping of cars, pricing of cars, financing car purchases, etc.

Task-oriented search tool 112 may search for the related or relevant tasks based on semantic analysis of the search terms. Task-oriented search tool 112 may include a semantic layer 111 that may be defined initially based on an understanding of user needs and requirements. The semantic layer definitions may evolve or mature over time based on observations of user behavior and user needs. Task-oriented search tool 112 may be configured to use search terms (and/or other entries in application input fields) not merely as literals but as concepts to identify the related or relevant tasks and the associated task-solving tools. For example, task-oriented search tool 112 may be configured to recognize that a search term "airline" is conceptually the same as the search term "flight" (e.g., under a concept "air transportation"), and identify the same sets of tasks and task-solving applications for either search term "airline" or "flight," by searching for "air transportation" using a principle of "conceptual search."

Task-oriented search tool 112 may search for the related or relevant tasks on the web. Alternatively or additionally, task-oriented search tool 112 may, in particular, search for the related or relevant tasks in a dedicated tasks repository or list 132, which may be stored, for example, in a network-accessible database 130.

Dedicated tasks repository 132 may include a number of pre-defined tasks. Dedicated tasks repository 132 may have been prepared, for example, by human editors or system administrators. The preparation may involve inspection of commonly used search terms and manual linking or association of the search terms with selected tasks. The selected tasks included in dedicated tasks repository 132 may be chosen based on consideration of user profiles and behaviors. In the context of an enterprise or business entity, the selected tasks may be user tasks that are permitted or assigned to the user by the enterprise or business entity. The selected tasks included in dedicated tasks repository 132 may be chosen based on consideration of the enterprise or business entity's profiles in addition to consideration of user profiles. To facilitate efficient searching, dedicated tasks repository 132 may use a controlled vocabulary or indexing terms to categorize tasks.

Each of the tasks in dedicated tasks repository 132 may be associated with one or more task-solving tools. Analogous to dedicated tasks repository 132, system 100 may maintain a list of task-solving tools (e.g., list of task-solving apps. 133) associated with each of the tasks in dedicated tasks repository 132. Task-oriented search tool 112 may search for task-solving applications and tools directly on the web and/or in the list of task-solving apps. 133 maintained by system 100.

The task-solving applications and tools may include any type of computer software or solutions that are or may be available. These software and solutions, which may be interactive, may include retail software, business and or enterprise software. The software and solutions may include proprietary software and/or public domain software.

In system 100, search engine application 110 may be further configured to present dual search results (i.e. identified tasks 151 and the task-solving tools 152 for performing the identified tasks) obtained by task-oriented search tool 112 in a combined manner on display 15.

In a version of system 100, search engine application 110 may analyze a search term in a user query, identify one or more tasks that are related to the search term, and present a set of one or more identified tasks sorted by relevance (e.g., in terms of popularity, frequency of previous use, or enterprise requirements) on display 15. Upon user selection of a specific task to investigate or perform, search engine application 110 may display one or more task-solving tools that may be of help in performing the specific task. The displayed task-solving tools for help in performing the specific task may be chosen by search engine application 110 based on various criteria including, for example, context, quality, popularity in common use, history of repeat use by particular users, enterprise or business entity policies and rules, etc. Search engine application 110 may rank the one or more task-solving tools that may be of help in performing the specific task using the various criteria. Search engine application 110 may display the tools in ranked order. For example, search engine application 110 may prominently display an application that is most popular in common use at the top of a list of applications ahead of other less popular applications.

The displayed task-solving tools for help in performing the specific task may be interactive applications that require, for example, further user input or interaction. Search engine application 110 may dynamically assist the user in solving the specific task by pre-configuring the displayed tool selected by the user to perform the specific task. Search engine application 110 may, for example, pre-fill user-input fields in the displayed task-solving tool with information based on the search terms used to identify the specific task, the user profile, and/or the enterprise or business entity profiles. Search engine application 110 may use the context of the search terms and other user input to generate the information used to pre-configure the displayed tool selected by the user to perform the specific task.

Figure 2:
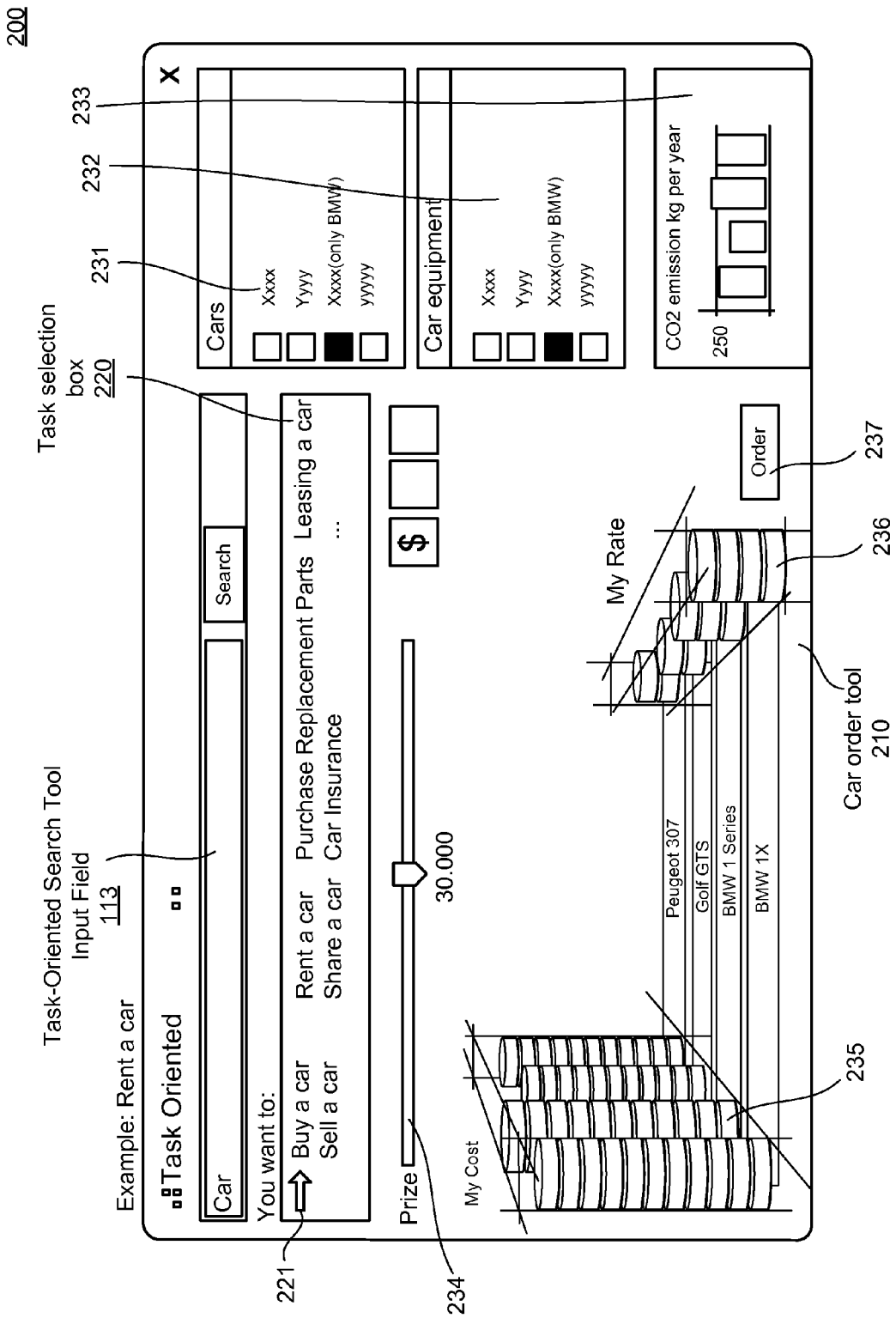
FIGS. 2-5 are examples of task-oriented search result presentations that may generated by the search engine application of FIG. 1, in accordance with the principles of the disclosure herein.
Figure 3:
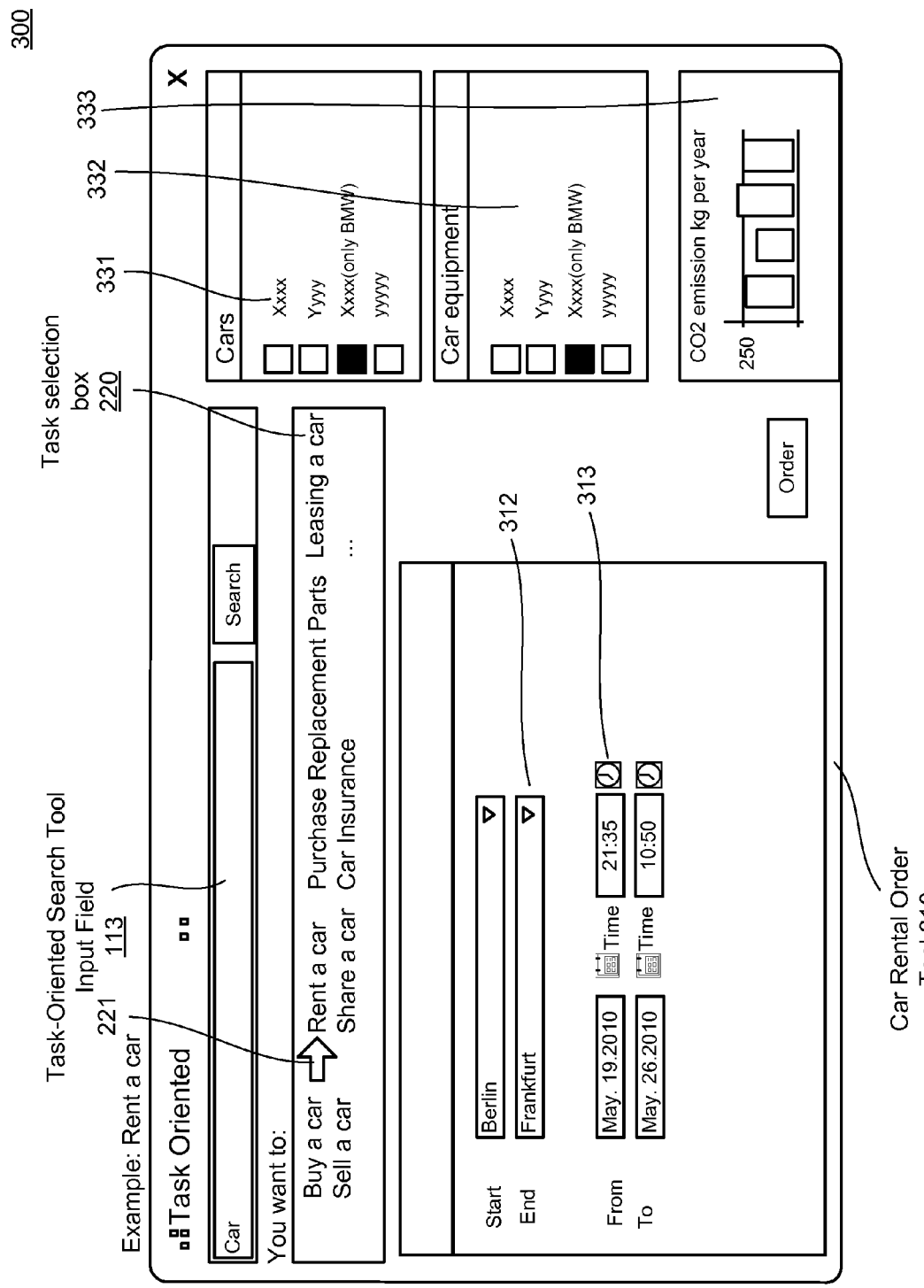
Figure 4:
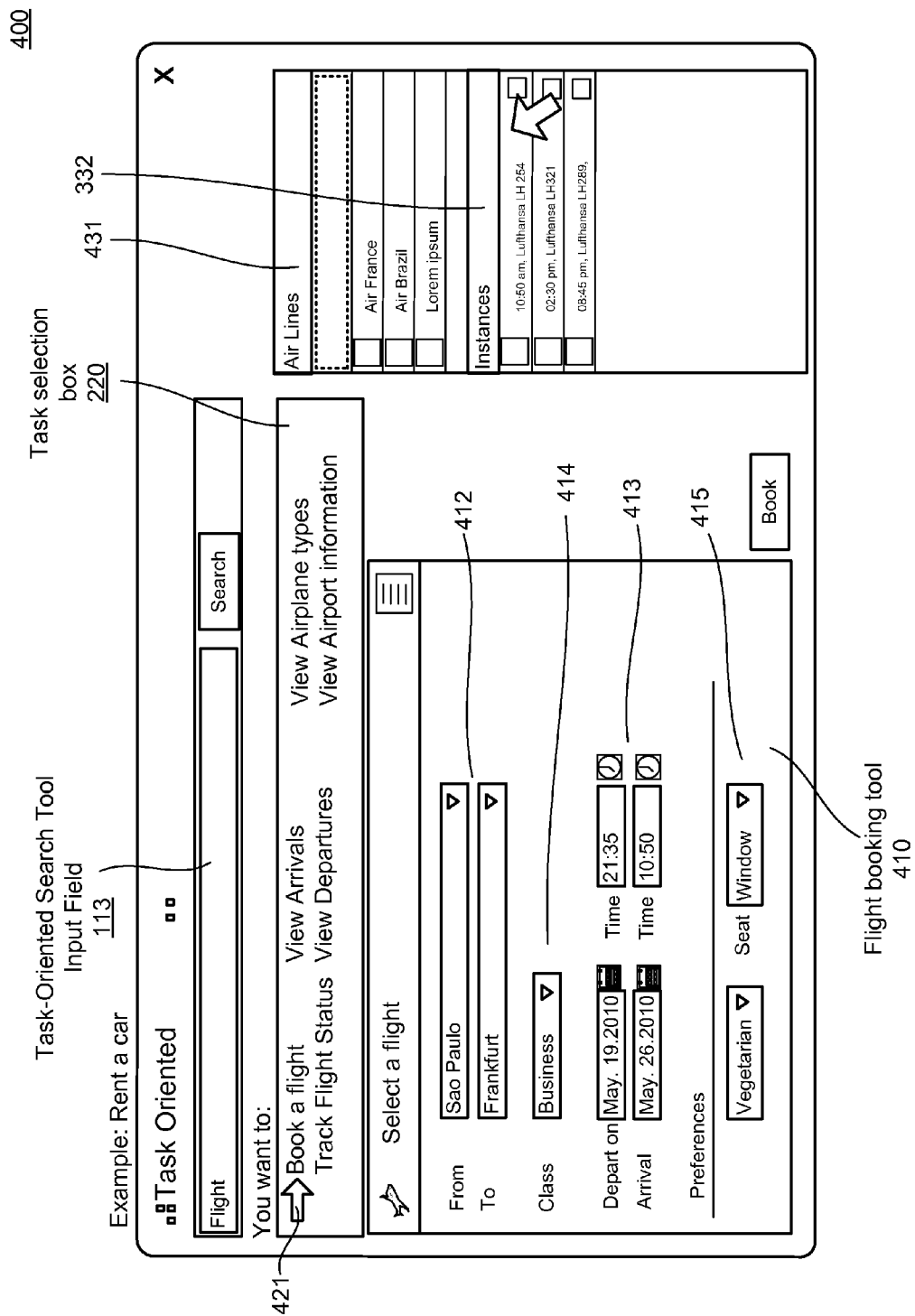
Figure 5:
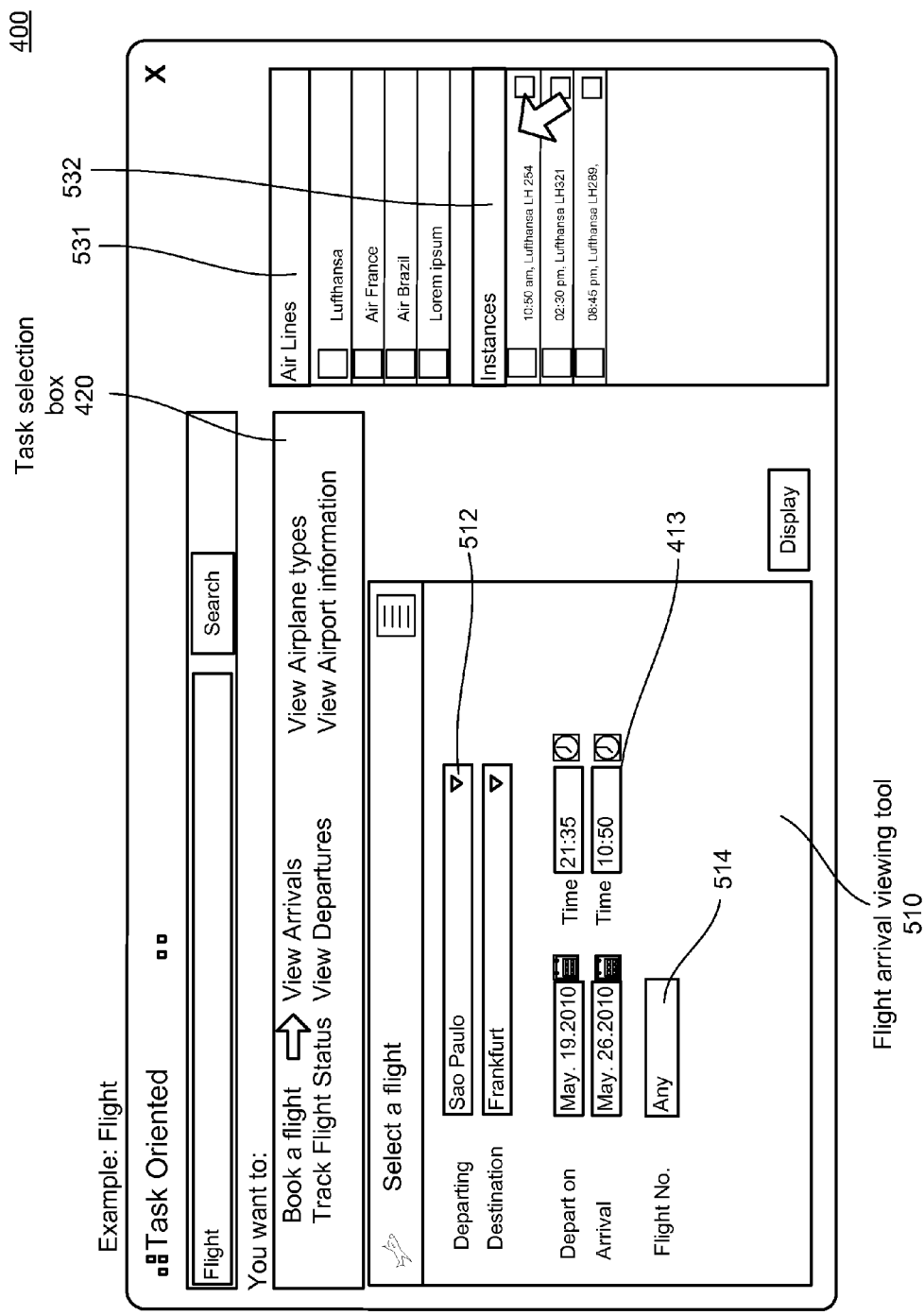

FIGS. 2-5 show examples of task-oriented search result presentations 200-500 that may be displayed on display 15 or other convenient user-interface by search engine application 110. In particular, FIGS. 2 and 3 show examples of task-oriented search result presentations 200 and 300 that may be triggered by a user search query for a "car," and FIGS. 4 and 5 show examples of task-oriented search result presentations 400 and 500 that may be triggered by a user search query for an "airline" or for a "flight." Presentations 200-500 may include conventional graphical user interface elements (e.g., drop-down menus, menu bars, lists, windows, text boxes, check boxes, buttons, hyperlinks, data grids, tabs, sliders, etc.) that can be used by a user to interact with search engine application 110 and navigate the task-oriented search results.

Search Term "Car"

With reference to presentation 200 in FIG. 2, a user may submit a search term (e.g., "car") via a search query field 113 to search engine 110. In response, search engine application 110/task-oriented search tool 112 may identify one or more tasks (e.g., in task repository 132) that are related or relevant to the search term "car." Task-oriented search tool 112 may, for example, identify several tasks namely "sell a car," "buy a car," "rent a car," "share a car," "car insurance," "purchasing replacement parts," and "leasing a car," as being related or relevant to the user's search query. Task-oriented search tool 112 may prioritize or rank the identified tasks based on, for example, prior usage, and display the ranked tasks for user action in presentation 200. FIG. 2 shows, for example, several of the identified tasks related to the search term "car" displayed in a task selection box 220. Task selection box 220 may be configured so that a user can select one of the displayed tasks for further investigation or action using, for example, a pointer, cursor, keyboard or other interaction technique. As shown for example, task selection box 220 may include a movable pointer arrow 221, which a user may move next to a task to select the task (e.g., "buy a car.") for further action.

Search engine application 110 may further include one or more task-solving tools in presentation 200 to accompany task selection box 220. The one or more task-solving tools may be presented in a list for user selection (not shown). Alternatively or additionally, search engine application 110/task-oriented search tool 112 may direct a user to a particular application or tool to solve a selected task. FIG. 2 shows, for example, a car order tool 210 which is directly displayed in presentation 200 to help or assist the user perform the selected task "buy a car."

Car order tool 210 may, for example, be any one of many popular publicly-available applications for on-line purchases of cars. Alternatively, car order tool 210 may be a tool, which is custom-developed or adapted for solving the tasks included in task repository 132. Car order tool 210 may include sub-applications or sub-tools to assist the user in comparison shopping of different types of cars. The sub-tools may, for example, include a maximum cost selector 234, a car type selector 231, a car equipment selector 232, a $CO_2$ emission comparator 233, a cost-vs.-car type comparator 235, a financing rate-vs.-car type comparator 236 and other elements, which may help a user in comparison shopping toward accomplishing the task "buy a car." Car order tool 210 may further include, for example, an action button (e.g., "order" button 237), which may allow the user to place an order "buy a car" on-line.

FIG. 3 shows another example of a particular application (e.g., car rental order tool 310) provided by search engine application 110/task-oriented search tool 112 for solving a selected task that may be related or relevant to the user's search query "car." In example presentation 300 shown in the figure, the user may have selected the task "rent a car" in task selection box 220 for further action. In response, search engine application 110 may display a car rental order tool 310 in presentation 300. Car rental order tool 310, like car order tool 210 shown in FIG. 2, may be a popular application for on-line car rentals or may be a custom-developed or adapted tool for solving tasks included in task repository 132.

Car rental order tool 310 may, for example, include input fields 312 for start and end locations and input fields 313 for dates and times of a desired the car rental. One or more of input fields 312 and 313 may be pre-filled by search application 110 based, for example, on information garnered from user profiles, past usage, and/or company policies or rules. In the example shown, input fields 312 for the start and end locations may be pre-filled as Berlin and Frankfurt based, for example, on the user's history of previous car rentals.

Car rental order tool 310 may also include one or more sub-applications or sub-tools to assist the user in comparison shopping of different types of rental cars. Car rental order tool 310 may, for example, include a car type selector 331, a car equipment selector 332, and a $CO_2$ emission comparator 333 that may help a user in comparison shopping toward accomplishing the task "rent a car." Car rental order tool 310 may further include, for example, an action button (e.g. "order" button 337), which may allow the user to place an on-line order to "rent a car" from display 15.

Search Term "Airline" or "Flight"

As noted previously, search engine application 110 may pre-configure a displayed tool for performing a specific task. Search engine application 110 may also assist the user during use of the displayed tool to perform the specific task. For this purpose, search engine application 110/task-oriented search tool 112 may use search terms and/or user entries in input fields not merely as literals but instead as concepts to direct or guide use of the displayed tool to perform the specific task.

With reference to presentation 400 in FIG. 4, a user may submit a search term (e.g., "airline") to search engine 110 via a search query field 413. Search engine 110 may recognize that the search term "airline" is conceptually the same as the search term "flight." In response to the search query "airline," search engine application 110/task-oriented search tool 112 may identify one or more tasks that are related or relevant to the conceptually equivalent search term "flight" in task repository 132. Task-oriented search tool 112 may, for example, identify several tasks namely "book a flight," "track flight status," "view arrivals," "view departures," "view airport information," and "view airplane types," as being related or relevant to the user's search query. Task-oriented search tool 112 may rank these identified tasks based, for example, on prior usage, and display the ranked tasks in a task selection box 420. Like task selection box 220 in FIG. 2, task selection box 420 may be configured so that a user can select one of the displayed tasks for further investigation or action using a pointer, cursor, keyboard or other interaction technique. As shown for example, task selection box 420 includes, for example, a movable pointer arrow 421, which a user may place to select a task (e.g., "book a flight") for further action.

In response, search engine application 110/task-oriented search tool 112 may display a particular application (e.g., flight booking tool 410) in presentation 400 to help or assist the user perform the selected task "book a flight." Flight booking tool 410, like car order tool 210 and car rental order tool 310 in FIGS. 2 and 3, may be a popular application for on-line flight booking or may be a tool that is custom-developed or adapted for solving tasks included in task repository 132.

Flight booking tool 410 may, for example, include input fields 412 for "from" and "to" airports/cities, input fields 413 for desired flight dates and times, input field 414 for class of the flight and other input fields 415 flight preferences such as for food type and seat selection. One or more of input fields 412-415 may be pre-filled by search application 110 based, for example, on information garnered from user profiles, past usage, and/or company policies or rules. As shown in the figure, city names Sao Paolo and Frankfurt may have been automatically entered in input fields 412 for the "from" and "to" airports/cities based on, for example, the user's previous flights history.

Flight booking tool 410, like car order tool 210 and car rental order tool 310, may further include sub-applications or sub-tools. These may assist the user in comparing flight options. In the version shown in the figure, flight booking tool 410 includes, for example, an airline selector 431 and a flight instance selector 432. Flight booking tool 420 may further include, for example, an action button (e.g., "book" button 437), which may allow the user to "book a flight" on-line from display 15.

FIG. 5 shows another example of a particular application (e.g., flight arrival viewing tool 510) displayed by search engine application 110/task-oriented search tool 112 to solve a task that is related or relevant to the user's search query "airline" or "flight." In presentation 500 shown in the figure, the user may have selected the task "view arrivals" in task selection box 420 for further investigation or action. In response, task-oriented search tool 112 may present a flight arrival viewing tool 510 in presentation 500. Flight arrival viewing tool 510, like the other task-solving tools (e.g., flight booking tool 410, car rental order tool 310, car order tool 210, etc.) may be a popular publicly available application or may be a tool that has been custom-developed or adapted for solving tasks included in task repository 132.

Flight arrival viewing tool 510 may, for example, include input fields 512 for "from" and "to" airports/cities, input fields 513 for dates and times, and input field 514 for flight number information. One or more of input fields 512-514 may be pre-filled by search application 110 based, for example, on information garnered from user profiles, past usage, and/or company policies or rules. In the example shown, task-oriented search tool 112 may have shared information (e.g., from and to airports information) from the user's previous task "book a flight" (FIG. 4) to pre-fill Sao Paolo and Frankfurt as city/airport names in input fields 512.

Flight arrival viewing tool 510 may further include sub-applications or sub-tools to assist the user in performing the task "view arrivals." In the version shown in the figure, flight arrival viewing tool 510 includes, for example, an airline selector 531 and a flight instance selector 532 (which may be the same as airline selector 431 and flight instance selector 432 shown in FIG. 4) in selecting flights for arrival information processing.

In the foregoing, flight booking tool 410 and flight arrival viewing tool 510 may have been described as separate tools for solving the tasks "book a flight" and "view arrivals," respectively. However, in practice these tools may be combined or integrated in a single application. In general, task-oriented search tool 112 may present the user with an integrated application with tools and sub-tools for solving more than one of the identified tasks (e.g., in task selection box 220). Such an integrated application may facilitate sharing of user-input and other information between a tool used in solving a task and another tool used for solving another task.

Figure 6:
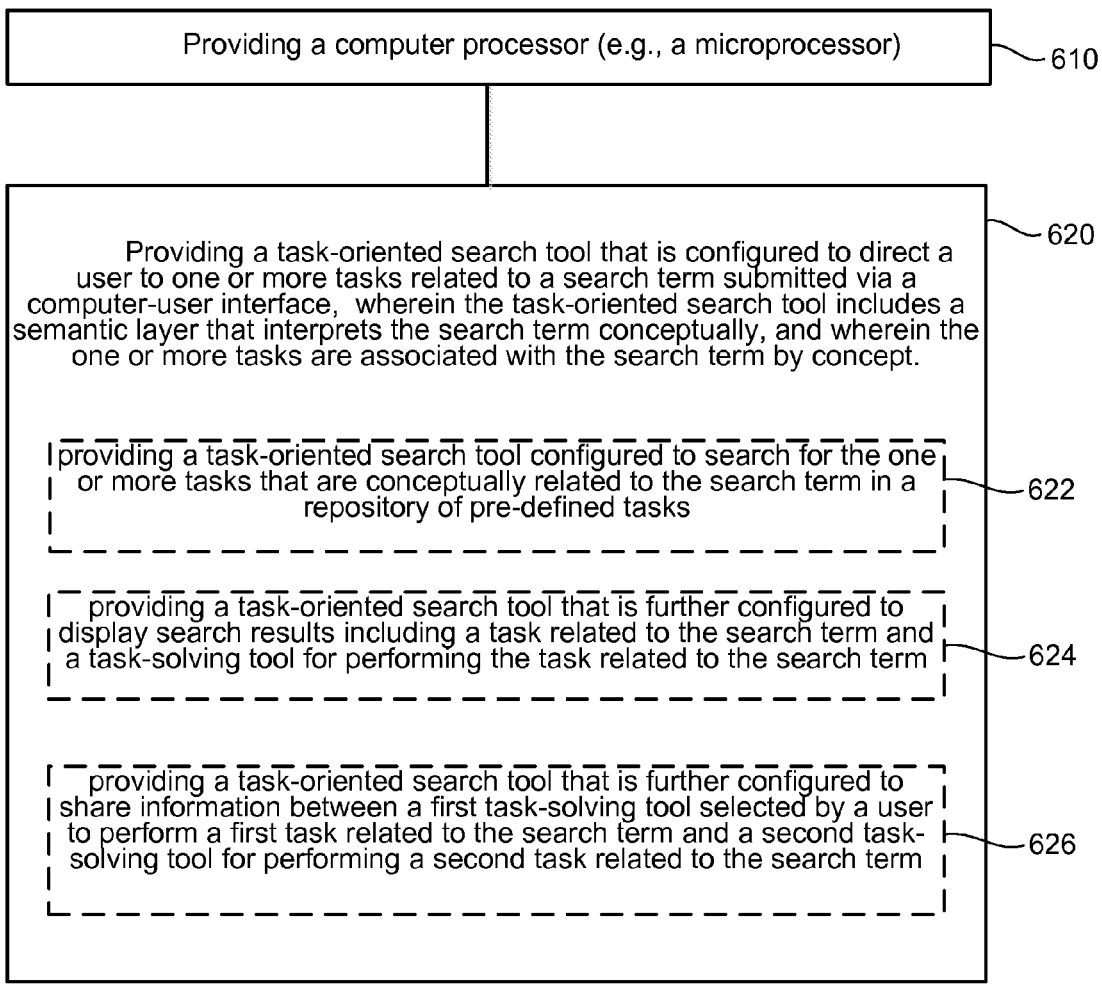
FIG. 6 is a flow chart illustration of an example computer-implemented method for directing users to tasks related to search terms and for assisting the users solve the tasks related to the search terms, in accordance with principles of the disclosure herein.

FIG. 6 shows an example computer-implemented method 600 for directing users to tasks related to search terms and for assisting users solve or perform the tasks. Method 600 includes providing a computer processor (610) and providing a task-oriented search tool that is configured to direct a user to one or more tasks related to a search term submitted via a computer-user interface (620). The task-oriented search tool may include a semantic layer that interprets the search term conceptually, and the one or more tasks may be associated with the search term by concept.

Method 600 may further include providing a repository of pre-defined tasks. A task in the repository of pre-defined tasks may be associated with one or more task-solving tools. Further, in method 600 providing the task-oriented search tool 620 may include providing a task-oriented search tool configured to search for the one or more tasks related to the search term in the repository of pre-defined tasks (622). Providing the task-oriented search tool 620 may also include providing a task-oriented search tool that is further configured to display search results including a task related to the search term and a task-solving tool for performing the task related to the search term (624). Providing the task-oriented search tool 620 may also include providing a task-oriented search tool that is further configured to share information between a first task-solving tool selected by a user to perform a first task related to the search term and a second task-solving tool for performing a second task related to the search term (626).

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system, comprising:
a processor;
a memory; and
a task-oriented search tool configured to direct a user to one or more tasks related to a search term,
wherein the task-oriented search tool includes a semantic layer that interprets the search term and assigns a concept to the search term, wherein the task-oriented search tool is further configured to search for and identify the one or more tasks related to the concept assigned to the search term, to display a set of the one or more identified tasks sorted by relevance on a display with each of the one or more identified tasks being displayed as descriptive text describing an intended result or intended action of the identified task, and to, upon user selection of a specific displayed task, additionally display a choice of one or more user-selectable task-solving tools for achieving the described intended result or intended action of the specific displayed task,
wherein the task-oriented search tool is further configured to display on a user-interface a plurality of user-selectable task-solving tools for user selection for performing the task related to the search term, and
wherein the task-oriented search tool is configured to search for and choose the plurality of user-selectable task-solving tools based on criteria including at least one of context, quality, popularity in common use, history of repeat use by particular users, and enterprise or business entity policies and rules.

2. The computer system of claim 1 further comprising a repository of pre-defined tasks, and wherein task-oriented search tool is configured to search for the one or more tasks related to the search term in the repository of pre-defined tasks.

3. The computer system of claim 2, wherein the repository of pre-defined tasks, in an enterprise implementation of the computer system, includes a set of tasks assigned to enterprise personnel by the enterprise.

4. The computer system of claim 2 wherein the repository of pre-defined tasks uses a controlled vocabulary to categorize tasks.

5. The computer system of claim 2 wherein a task in the repository of pre-defined tasks is associated with one or more task-solving tools.

6. The computer system of claim 1, wherein the task-oriented search tool is further configured to display on a user-interface search results including:
a task related to the search term; and
a task-solving tool for performing the task related to the search term.

7. The computer system of claim 1, wherein the task-oriented search tool is further configured to share information between a first task-solving tool selected by a user to perform a first task related to the search term and a second task-solving tool for performing a second task related to the search term.

8. A computer-implemented method comprising:
providing a processor; and
providing a task-oriented search tool that is configured to direct a user to one or more tasks related to a search term submitted via a computer-user interface,
wherein the task-oriented search tool includes a semantic layer that interprets the search term and assigns a concept to the search term, and wherein the task-oriented search tool is further configured to search for and identify the one or more tasks related to the concept assigned to the search term, to display a set of the one or more identified tasks sorted by relevance on a display with each of the one or more identified tasks being displayed as descriptive text describing an intended result or intended action of the identified task, and to, upon user selection of a specific displayed task, additionally display a choice of one or more user-selectable task-solving tools for achieving the described intended result or intended action of the specific displayed task,
wherein the task-oriented search tool is further configured to display on a user-interface a plurality of user-selectable task-solving tools for user selection for performing the task related to the search term, and
wherein the task-oriented search tool is configured to search for and choose the plurality of user-selectable task-solving tools based on criteria including at least one of context, quality, popularity in common use, history of repeat use by particular users, and enterprise or business entity policies and rules.

9. The method of claim 8 wherein providing the task-oriented search tool includes providing a task-oriented search tool configured to search for the one or more tasks related to the search term in a repository of pre-defined tasks.

10. The method of claim 9 wherein the repository of pre-defined tasks includes a set of tasks that are assigned to users or an enterprise or business entity's personnel under the entity's policies or rules.

11. The method of claim 9 wherein a task in the repository of pre-defined tasks is associated with one or more task-solving tools.

12. The method of claim 8, wherein the task-oriented search tool is further configured to display search results including:
a task related to the search term; and
a user-selectable task-solving tool for performing the task related to the search term.

13. The method of claim 12, wherein the task-oriented search tool is further configured to display a plurality of user-selectable task-solving tools for performing the task related to the search term.

14. The method of claim 12, wherein the task-oriented search tool is further configured to share information between a first task-solving tool selected by a user to perform a first task related to the search term and a second task-solving tool for performing a second task related to the search term.

15. A non-transitory computer readable medium, comprising:
instructions capable of being executed on a processor, which instructions when executed allow a computer device to:

provide a task-oriented search tool that is configured to direct a user to one or more tasks related to a search term submitted via a computer-user interface, wherein the task-oriented search tool includes a semantic layer that interprets the search term and assigns a concept to the search term, wherein the task-oriented search tool is further configured to search for and identify the one or more tasks related to the concept assigned to the search term, to display a set of the one or more identified tasks sorted by relevance on a display with each of the one or more identified tasks being displayed as descriptive text describing an intended result or intended action of the identified task, and to, upon user selection of a specific displayed task, additionally display a choice of one or more user-selectable task-solving tools for achieving the described intended result or intended action of the specific displayed task, wherein the task-oriented search tool is further configured to display on a user-interface a plurality of user-selectable task-solving tools for user selection for performing the task related to the search term, and wherein the task-oriented search tool is configured to search for and choose the plurality of user-selectable task-solving tools based on criteria including at least one of context, quality, popularity in common use, history of repeat use by particular users, and enterprise or business entity policies and rules.

16. The non-transitory computer readable medium of claim 15, wherein the instructions when executed on the processor cause the task-oriented search tool to search for the one or more tasks related to the search term in a repository of predefined tasks that includes a set of tasks that are assigned to users or an enterprise or business entity's personnel under the entity's policies or rules.

17. The non-transitory computer readable medium of claim 15, wherein the instructions when executed on the processor cause the task-oriented search tool to display search results including:
 a task related to the search term; and
 a user-selectable task-solving tool for performing the task related to the search term.

18. The non-transitory computer readable medium of claim 17, wherein the instructions when executed on the processor cause the task-oriented search tool to share information between a first tool selected by a user to perform a first task related to the search term and a second tool for performing a second task related to the search term.

* * * * *